United States Patent
Ha et al.

(10) Patent No.: US 7,790,220 B2
(45) Date of Patent: Sep. 7, 2010

(54) METHOD TO MANUFACTURE COMPOSITE POLYMER ELECTROLYTE MEMBRANES COATED WITH INORGANIC THIN FILMS FOR FUEL CELLS

(75) Inventors: Heung-Yong Ha, Seoul (KR); Soon-Jong Kwak, Seoul (KR); Daejin Kim, Gyeongsangbuk-do (KR); Juno Shim, Seoul (KR); In-Hwan Oh, Seoul (KR); Seong-Ahn Hong, Seoul (KR); Tae-Hoon Lim, Seoul (KR); Suk-Woo Nam, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 1924 days.

(21) Appl. No.: 10/751,138

(22) Filed: Dec. 30, 2003

(65) Prior Publication Data

US 2004/0241520 A1    Dec. 2, 2004

(30) Foreign Application Priority Data

May 31, 2003    (KR)    ............... 10-2003-0035127

(51) Int. Cl.
    *B05D 5/12* (2006.01)
(52) U.S. Cl. ............... 427/115; 427/126.3; 427/576; 204/192.1
(58) Field of Classification Search ............... 427/115, 427/126.3, 576
    See application file for complete search history.

(56) References Cited

U.S. PATENT DOCUMENTS

| | | | | |
|---|---|---|---|---|
| 4,250,013 A | * | 2/1981 | Carlin | 204/282 |
| 5,271,972 A | * | 12/1993 | Kwok et al. | 427/579 |
| 5,439,736 A | * | 8/1995 | Nomura | 428/308.4 |
| 5,558,957 A | * | 9/1996 | Datta et al. | 429/127 |
| 5,670,224 A | * | 9/1997 | Izu et al. | 428/35.8 |
| 5,789,071 A | * | 8/1998 | Sproul et al. | 428/216 |
| 5,858,264 A | * | 1/1999 | Ichino et al. | 252/62.2 |
| 5,879,828 A | * | 3/1999 | Debe et al. | 429/41 |
| 6,156,449 A | * | 12/2000 | Zuber et al. | 429/42 |

(Continued)

FOREIGN PATENT DOCUMENTS

EP    A-0708791    *    6/1996

(Continued)

OTHER PUBLICATIONS

Nouel and Fedkiw, "Nafion-based Composite Polymer Electrolyte Membranes," Electrochem. Acta 45:2381-2387, 1997.*

(Continued)

*Primary Examiner*—Bret Chen
(74) *Attorney, Agent, or Firm*—Merchant & Gould P.C.

(57) ABSTRACT

The present invention, by coating the polymer electrolyte membranes for fuel cells with inorganic thin films via a PECVD method or a reactive sputtering method, reduces the methanol crossover sizably without seriously reducing the ionic conductivity of polymer electrolyte membranes, thereby, when applied to fuel cells, realizes a high performance of fuel cells. A surface of membrane can be coated with inorganic thin films made of inorganic materials, which are for example silicone oxide, titanium oxide, etc., so as to make composite polymer electrolyte membrane. For coating, plasma enhanced chemical vapor deposition method or reactive method can be used.

9 Claims, 2 Drawing Sheets

U.S. PATENT DOCUMENTS

| | | |
|---|---|---|
| 6,416,898 B1 * | 7/2002 | Ohzu et al. .................... 429/33 |
| 6,503,378 B1 | 1/2003 | Fisher |
| 6,523,699 B1 * | 2/2003 | Akita et al. ................. 210/490 |
| 6,555,619 B1 * | 4/2003 | Kennedy et al. ............. 525/100 |
| 6,689,501 B2 * | 2/2004 | Stone et al. .................... 429/30 |
| 6,893,763 B2 * | 5/2005 | Fan et al. ...................... 429/33 |
| 2002/0114958 A1 * | 8/2002 | Ozeki et al. ................. 428/446 |
| 2003/0170520 A1 | 9/2003 | Fujii et al. |

FOREIGN PATENT DOCUMENTS

| | | |
|---|---|---|
| JP | 5-258756 | 10/1993 |
| JP | 6-196178 | 7/1994 |
| KR | 1020020004065 | 1/2002 |
| KR | 1020020074582 | 10/2002 |

OTHER PUBLICATIONS

Kannan, Ramaiyan, et al., "Polymer Electrolyte Fuel Cells Using Nafion-Based Composite Membranes with Functionalized Carbon Nanotubes". Angew. Chem. Int. Ed. 2008, 47, pp. 2653-2656.*

Park, Ki Tae, et al., "ZrO2-SiO2/Nafion composite membrane for polymer electrolyte membrane fuel cells operation at high temperature and low humidity". Journal of power sources, 2008, vol. 177, No. 2, pp. 247-253. Abstract Only.*

Jun, Yu, et al., "Nafion/Silicon Oxide Composite Membrane for High Temperature Proton Exchange Membrane Fuel Cell". Journal of Wuhan University of Technology—Materials Science Edition, vol. 22, No. 3, Sep. 2007, pp. 478-481. Abstract Only.*

Morosanu, C.E., editor, "Thin Films by Chemical Vapor Deposition". Elsevier, Amsterdam, 1990, pp. 42-43.*

Hobson, L.J. et al., "Modified Nafion 117 as an Improved Polymer Electrolyte Membrane for Direct Methanol Fuel Cells," *Jrnl. of the Electrochemical Society*, vol. 148, No. 10, pp. A1185-A1190 (2001).

Hobson, L.J. et al., "Targeting improved DMFC performance," *Jrnl. of Power Sources*, vol. 104, pp. 79-84 (2002).

Jung, D.H. et al., "Performance evaluation of Nafion/silicon oxide hybrid membrane for direct methanol fuel cell," *Jrnl. of Power Sources*, vol. 106, pp. 173-177 (2002).

Office Action mailed on Mar. 28, 2009 for co-pending US Appl. No. 11/796,469.

* cited by examiner

METHOD TO MANUFACTURE COMPOSITE POLYMER ELECTROLYTE MEMBRANES COATED WITH INORGANIC THIN FILMS FOR FUEL CELLS

BACKGROUND OF THE INVENTION

1. Field of the Invention

The present invention relates to a method to manufacture composite polymer electrolyte membranes coated with inorganic thin films for fuel cells and applications of these membranes; more particularly to a method of coating the surface of commercial polymer electrolyte membranes with inorganic thin films using a plasma enhanced chemical vapor deposition (PECVD) method or a reactive sputtering method, thus reducing the methanol permeability without a sizable decrease of ionic conductivity, thereby realizing a lower methanol permeability than that of conventional Nafion® membranes or other composite polymer electrolyte membranes and, therefore, enhancing the performance of methanol fuel cells, and also relates to composite polymer electrolyte membranes coated with inorganic thin films for fuel cells, which are manufactured by said method Also, the present method relates to an membrane-electrode assembly (MEA) employing composite polymer electrolyte membranes coated with inorganic thin films for fuel cells, which are manufactured by the aforementioned method, and a method to manufacture the same.

2. Description of the Related Art

A direct methanol fuel cell (hereinafter referred to as "DMFC") has the same structure and operates on the same principle as a polymer electrolyte membrane fuel cell (hereinafter referred to as "PEMFC") using hydrogen, but in case of the DMFC, methanol is directly fed to the anode as a fuel instead of hydrogen. Therefore, its fuel feeding system and overall device is simple compared with the PEMFC, which makes it available in a compact-size. Also, the DMFC has other advantages that the liquid fuel composed of methanol and water functions as a coolant as well as a fuel, the whole device is compact and light-weighted, the operating temperature is much lower than that of the conventional fuel cells, and it can operate for a longer duration at a time due to its convenient refueling.

However, the DMFC has drawbacks that its electrode performance is low due to the methanol oxidation at the cathode side, the platinum catalyst is poisoned by carbon monoxide which is one of reaction products, and the power density is lower than that of PEMFCs. Also, the DMFC has other drawbacks of excessive consumption of expensive platinum catalyst and gradual performance degradation. Yet, the most serious problem of the DMFC is the degradation of its cell performance due to methanol crossover from the anode to the cathode.

The DMFC can overcome limitations on small-sized batteries and inconveniences caused by recharging needs and, therefore, has high prospects of being used as portable power sources for mobile phones, PDAs, and notebook computers. Further, with more improvement in performance, the DMFC could be made available as an automobile power source.

In these DMFCs, an electrolyte membrane carries out not only the role as a proton conductor from the anode to the cathode but also the role as a barrier to methanol and oxygen. Therefore, polymer electrolyte membranes for fuel cells should have a high ionic conductivity and yet a low electronic conductivity. Also, polymer electrolyte membranes for fuel cells should transfer less methanol or water, and be highly stable mechanically, thermally, and chemically.

However, although Nafion® membranes of Du Pont in general use or other commercially available membranes have a superior ionic conductivity, they have the problem that methanol is permeated from the anode to the cathode. This permeated methanol is oxidized on the cathode, poisoning the platinum catalyst thereby causing mixed potentials and, therefore, degrading the whole performance of the cell.

Lots of researches have been performed to resolve this crossover problem in DMFCs. The researches are carried out in two different directions. One is to develop new polymer electrolyte membranes; the other is to improve conventional commercial polymer electrolyte membranes.

As a former example, U.S. Pat. No. 6,503,378 describes a method of manufacturing a composite polymer electrolyte membrane superior in thermal, chemical, and mechanical characters, in which the polymer electrolyte membrane comprised of a hydrophobic hydrocarbon region and a hydrophilic region that are covalently bound to form a single polymer molecule. However, this method is short of reducing the methanol crossover.

Korean Unexamined Patent Publication No. 2002-0004065 describes a method of manufacturing partly fluorinated copolymers based on vinyl compounds substituted with trifluorostyrene, and ionic conductive polymer electrolyte membranes made of the same. It is described that electrolytes can be manufactured with a superior mechanical property at low cost and the swelling can be reduced compared with conventional cases. Yet, it does not report that the methanol permeability can be reduced.

Korean Unexamined Patent Publication No. 2002-0074582 describes a method, in which mixed polymer solutions are made by adding perfluorinate ionomers (eg. Nafion® solution) in polymer matrix, and then polymer membrane is manufactured by casting method, and composite membrane is obtained by coating the perfluorinate ionomers on both sides of the membrane. This method is described to manufacture composite membranes with a superior performance characteristics at a lower cost compared with commercially available Nafion® membranes. Yet, it has drawbacks that the mechanical property of the composite membrane is inferior and the manufacturing process is complicated.

As a second example of modifying Nafion® membranes, some researchers proposed a method producing Nafion®/silicon oxide composite membranes via sol-gel reaction using Nafion® 115 and tetraethylorthosilicate (TEOS) [D. H. Jung, S. Y. Cho, D. H. Peck, D. R. Shin and J. S. Kim, Journal of Power Sources, 106 (2002) 173-177]. This method showed that the methanol permeability decreases with increasing silicon oxide content in the membrane. In cells using this composite membranes according to said method, the current density was 650 mA/cm$^2$ at a cell voltage of 0.5 V and temperature of 120, which is a superior result when compared with other commercial membranes. However, this method has drawbacks that the ionic conductivity is decreased compared with Nafion® membranes and the performance is decreased with increasing silicon oxide content more than 12%.

As another example, some researches proposed a fabrication method in which a polybenzimidazole layer is formed at the surface of Nafion® membrane by screen printing method [L. J. Hobson, Y. Nakano, H. Ozu and S. Hayase, Journal of Power Sources, 104 (2002) 79-84]. The composite polymer electrolyte membrane via this method was shown to reduce the methanol permeability by 40 to 60% and the cell performance was improved by 46%. However, the ionic conductivity has been decreased by about 50% compared with Nafion® membranes.

Also, another method to manufacture membranes has been proposed, which improved the cell performance by 51%. This method performs a surface treatment by exposing the surface of Nafion® membrane in electron beam of 9.2 µC/cm² at 35kV of accelerated voltage [L. J. Hobson, H. Ozu, M. Yamaguchi, and Hayase, Journal of The Electrochemical Society, 148, 10 A1185-A1190 (2001)]. However, this modified membrane does not reduce the methanol crossover as compared with Nafion® membrane, and shows a drawback that sulfonic groups on the surface are eliminated to a sizable degree.

Therefore, a novel method to manufacture polymer electrolyte membranes for fuel cells is required to improve the fuel cell performance by resolving the drawbacks of conventional polymer electrolyte membranes for fuel cells and even more reducing the methanol crossover.

SUMMARY OF THE INVENTION

An object of the invention is to provide a method to manufacture composite polymer electrolyte membranes coated with inorganic thin films for fuel cells and the membranes made by the same method, in which the surface of composite polymer electrolyte membranes are coated with inorganic thin films using a PECVD method or a reactive sputtering method, thus reducing the methanol permeability without a sizable decrease of ionic conductivity, thereby realizing a more reduced methanol permeability than that of conventional Nafion® membranes or other composite polymer electrolyte membranes and, therefore, enhancing the performance of methanol fuel cells.

Another object of the invention is to provide a membrane-electrode assembly (hereinafter referred to as 'MEA') and a fuel cell which employs the composite polymer electrolyte membranes coated with inorganic thin films, and the manufacturing method of the same.

To accomplish the above objects, the method to manufacture composite polymer electrolyte membranes coated with inorganic thin films for fuel cells according to the present invention is characterized to obtain composite membranes by coating the surface of the composite polymer electrolyte membrane for fuel cells with inorganic thin films using a PECVD method or a reactive sputtering method.

In the method to manufacture composite polymer electrolyte membranes coated with inorganic thin films for fuel cells according to the present invention, inorganic materials of said inorganic thin films are chosen one or more from the group comprising silicon oxide ($SiO_2$), titanium oxide ($TiO_2$), zirconium oxide ($ZrO_2$), zirconium phosphate ($Zr(HPO_4)_2$), zeolite, silicalite, and aluminum oxide ($Al_2O_3$).

In the method to manufacture composite polymer electrolyte membranes coated with inorganic thin films for fuel cells according to the present invention, said polymer electrolyte membranes are perfluorosulfonic acid membranes such as NAFION® membrane (Du Pont), DOW® membrane (Dow Chemical), FLEMION® membrane (Asahi Glass Co.), ACIPLEX® membrane (Asahi Chem.), BAM™ (Ballarde), or GORE-SELECT® membrane (W.L. Gore, Inc.); polymer electrolyte membranes made of proton conducting hydrocarbon polymers such as sulfonic polysulfone, sulfonic polyethylene, sulfonic polypropylene, sulfonic polystyrene, sulfonic polyphenol formaldehyde, polystyrene divinylbenzene sulfonic acid, sulfonic polybenzyimidasol, sulfonic polyamide, or sulfonic polyether-ether ketone; or polymer electrolyte membranes made of proton conducting polymers containing florine such as sulfonic polyvinylidene fluoride, sulfonic polytetrafluorethylene, or fluoric ethylene propylene.

In the method to manufacture composite polymer electrolyte membranes coated with inorganic thin films for fuel cells according to the present invention, the PECVD method uses reactants being one or more monomers chosen from the group of organic metal compounds containing aluminum, titanium, silicon, and zirconium in conjunction with one or more gases from the group of oxygen, nitrogen, hydrogen, steam, and argon.

In the method to manufacture composite polymer electrolyte membranes coated with inorganic thin films for fuel cells according to the present invention, said organic metal compounds are one or more chosen from the group comprising trimethyl disiloxanes (TMDSO), hexamethyl disiloxane (HMDSO), hexamethyl disilane, tetraethyl orthosilicate (TEOS), tetramethyl orthosilicate, tetrabuthyl orthosilicate, tetraisopropyl orthosilicate, aluminium methoxide, aluminium ethoxide, aluminium butoxide, aluminium isopropoxide, titanium ethoxide, titanium methoxide, titanium butoxide, titanium isopropoxide, zirconium ethoxide, and zirconium butoxide.

In the method to manufacture composite polymer electrolyte membranes coated with inorganic thin films for fuel cells according to the present invention, said reactive sputtering method is characterized to use a 99% or higher pure metal target such as Si, $SiO_2$, SiNH, Al, Zr, or Ti, and to maintain its initial pressure at a high vacuum range of $1.0\ 10^{-3}$ torr to $1.0\ 10^{-6}$ torr.

In the method to manufacture composite polymer electrolyte membranes coated with inorganic thin films for fuel cells according to the present invention, said reactive sputtering method is characterized to vapor-depositing an in organic film on the target surface after cleaning by sputtering the surface in a 99.9% or higher argon gas atmosphere so as to prevent oxidation of the target surface during the sputtering.

In the method to manufacture composite polymer electrolyte membranes coated with inorganic thin films for fuel cells according to the present invention, said PECVD device or reactive sputtering method is characterized to have a microwave power at the range of 10 watts to 500 watts.

In the method to manufacture composite polymer electrolyte membranes coated with inorganic thin films for fuel cells according to the present invention, the reaction chamber pressure of said PECVD method or reactive sputtering method is in the range of 1.0 to 1000 millitorr.

In the method to manufacture composite polymer electrolyte membranes coated with inorganic thin films for fuel cells according to the present invention, the argon pre-treatment electromagnetic wave power of said PECVD method or reactive sputtering method is in the range of 10 watts to 500 watts.

In the method to manufacture composite polymer electrolyte membranes coated with inorganic thin films for fuel cells according to the present invention, the argon pre-treatment pressure of said PECVD method is in the range of 1.0 to 500 millitorr.

In the method to manufacture composite polymer electrolyte membranes coated with inorganic thin films for fuel cells according to the present invention, the reaction gas pressure in the chamber of said PECVD method is in the range of 10 to 500 millitorr.

In the method to manufacture composite polymer electrolyte membranes coated with inorganic thin films for fuel cells according to the present invention, the distance between electrodes of said PECVD method is in the range of 1 to 30 cm.

In the method to manufacture composite polymer electrolyte membranes coated with inorganic thin films for fuel cells according to the present invention, the thickness of said inorganic films is in the range of 1.0 to 500 nm.

The method to manufacture composite polymer electrolyte membranes coated with inorganic thin films for fuel cells according to the present invention further comprises a step of coating the surface of composite polymer electrolyte membrane with an ionomer solution of commercial polymer electrolyte membranes mixed with a solution of water and iso-prophyl alcohol, after coating said inorganic film on the surface, so as to enhance contact with the electrodes during manufacturing the fuel cells.

A composite polymer electrolyte membrane coated with inorganic thin films for fuel cells according to the present invention is characterized to be manufactured via the aforementioned method.

A MEA according to the present invention employs the composite polymer electrolyte membranes coated with inorganic thin films for fuel cells manufactured via the aforementioned method.

A method of manufacturing an MEA according to the present invention includes a process of coating catalyst compounds for electrodes directly on the composite polymer electrolyte membranes coated with inorganic thin films for fuel cells manufactured via the aforementioned method. Said direct coating of the electrode catalyst, in which the electrode comprises catalysts and ionic conductive materials, is to reduce the contact resistance between the electrolyte membrane and the electrodes.

A fuel cell according to the present invention employs the composite polymer electrolyte membranes coated with inorganic thin films for fuel cells manufactured via the aforementioned method.

DETAILED DESCRIPTION OF THE INVENTION

The PECVD technique utilizes a phenomenon that, when gas and inorganic vapor are transfered into plasma under low pressure, polymer materials are produced and coated on the substrate surface. If polymerization reactions take place under near vacuum condition, polymerized polymers grow to a film on the surrounding solid surfaces. Therefore, the PECVD method is suitable for manufacturing of membranes and improving of solid surfaces. The PECVD has the following advantages.

① Coating is uniform without flaws.

② There are a variety of choices on coating materials, since polymerization is possible even when monomers has no functional group.

③ Coating is possible on any material if it is stable under the vacuum.

④ Adhesive strength of the coated film is superior.

⑤ Environmental pollution due to solvents is prevented, since the method is performed in a dry condition.

⑥ The method is economic, since it consumes less materials and energy.

A film manufactured by the PECVD method is generally known to have a highly crosslinked and tight structure, a good mechanical property, superior insolubility and thermal stability. A prepared membrane is known to be uniform without pinholes and to have a superior barrier property against gases and liquids. Also, since the film is superior in its adhesive strength, it can be used as protective materials for substrates.

Figure 1:
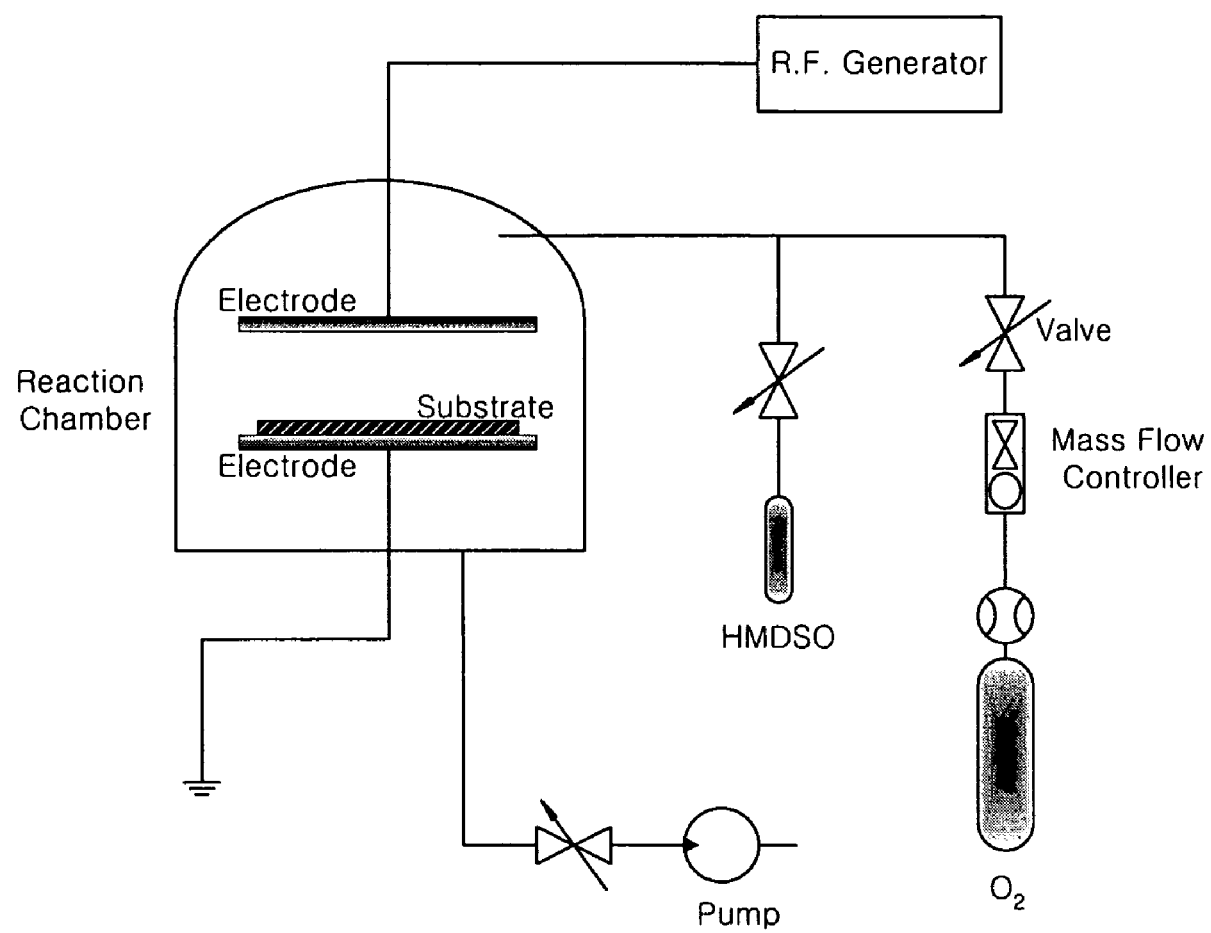
FIG. 1 shows a schematic representation of a plasma enhanced chemical vapor deposition (PECVD) device used to coat polymer electrolyte membranes with inorganic thin films for fuel cells according to the present invention.

FIG. 1 shows a schematic representation of a PECVD device used in the present invention.

In the PECVD device of FIG. 1, power is supplied to the upper aluminum electrode in the reaction chamber using a RF wave generator with frequency of 13.56 MHz for plasma generation connected with an impedance matching device. Monomer reactants are fed in a spray from the upper electrode side with feeding rate regulated by a fine flow regulation valve. The polymer electrolyte membrane for surface-improvement (for example, a Nafion® membrane) is mounted at the center of lower electrode in the reaction chamber. The initial internal pressure of the reaction chamber is lowered below 1 to 2 mTorr. When the flow rate of monomer becomes stabilized, plasma treatment is performed for a predetermined duration at a desired discharge power using the RF generator at frequency of 13.56 MHz.

Compound film manufactured by the reactive sputtering method is more favorable with respect to manufacturing process, degree of purity, and cost, as compared with the direct sputtering on oxide or nitride targets. That is because the gaseous atoms recoiled from the target are very unstable and tend to react with reactive gases so that they form a film on a substrate rapidly. If the substrate temperature is increased during reactive sputtering, the rate of film formation increases as the compound formation rate increases.

In the method to manufacture oxide films via the reactive sputtering according to the present invention, metal oxide films are formed by using metal targets such as silicon, zirconium, and titanium in the sputtering reaction chamber filled with oxygen or steam in combination with nitrogen or argon.

When a DMFC is fabricated using composite polymer electrolyte membranes coated with inorganic thin films for fuel cells according to the present invention, in order to reduce the contact resistance between polymer membranes and electrodes, the surface of the composite membrane is sprayed with ionomer solution of commercial electrolytes mixed with distilled water and iso-propylene alcohol (IPA) at a pre-determined ratio and stirred well to make a uniform solution.

An MEA is manufactured by coating with platinum-ruthenium catalysts for anode on one side of composite polymer electrolyte membranes and coating with platinum catalysts for cathode on the other side. The catalyst loading of the anode and cathode are made to be 0.1 to 10 mg/cm$^2$ on the metal basis, respectively.

A unit cell is manufactured by assembling after attaching a carbon-cloth or carbon-paper as a gas diffusion layer to both sides of a MEA fabricated by the aforementioned method.

The purpose, characteristics, and advantages of the present invention will become more apparent through the descriptions on preferred embodiments of the present invention. The following embodiments show a method to manufacture polymer electrolyte membranes for fuel cells according to the present invention and some examples of the performance measurement results of polymer electrolyte membranes manufactured by the same method. It should be understood, however, that the detailed description and specific embodyments are given by way of illustration only, since various changes and modifications within the spirit and scope of the invention will become apparent to those skilled in the art.

EMBODIMENT 1

A composite polymer electrolyte membrane coated with inorganic thin films was manufactured by coating with silica to a thickness of 10 nm on the surface of a Nafion® 115 membrane (Du Pont) via a PECVD method which uses silicon ethoxide (Product of Aldrich) as reactants. For composite polymer electrolyte membrane thus manufactured, the ionic conductivity was 0.091 S/cm and the methanol permeability was $1.68 \times 10^{-6}$ cm$^2$/sec (see Tables 1 and 2 below).

EMBODIMENT 2

A composite polymer electrolyte membrane coated with inorganic thin films was manufactured by coating with silica to a thickness of 30 nm on the surface of a Nafion® 115 membrane (Du Pont) via a PECVD method which uses silicon ethoxide (Product of Aldrich) as reactants. For composite polymer electrolyte membrane for fuel cells thus fabricated, the ionic conductivity was 0.075 S/cm and the methanol permeability was $8.25 \times 10^{-7}$ cm$^2$/sec (see Tables 1 and 2 below).

EMBODIMENT 3

A composite polymer electrolyte membrane coated with inorganic thin films was manufactured by coating with silica to a thickness of 50 nm on the surface of a Nafion® 115 membrane (Du Pont) via a PECVD method which uses silicon methoxide (Product of Aldrich) as reactants. For composite polymer electrolyte membrane thus manufactured, the ionic conductivity was 0.076 S/cm and the methanol permeability was $9.09 \times 10^{-7}$ cm$^2$/sec (see Tables 1 and 2 below).

EMBODIMENT 4

A composite polymer electrolyte membrane coated with inorganic thin films was manufactured by coating with alumina to a thickness of 70 nm on the surface of a Nafion®115 membrane (Du Pont) via a PECVD method which uses aluminum-secondary-butoxide (Product of Aldrich) as reactants. For composite polymer electrolyte membrane for fuel cells thus manufactured, the ionic conductivity was 0.071 S/cm, and the methanol permeability was $7.37 \times 10^{-7}$ cm$^2$/sec (see Tables 1 and 2 below).

EMBODIMENT 5

A composite polymer electrolyte membrane coated with inorganic thin films was manufactured by coating with alumina to a thickness of 70 nm on the surface of a Nafion® 115 membrane (Du Pont) via a PECVD method which uses titanium isopropoxide (Product of Aldrich) as reactants. For composite polymer electrolyte membrane thus manufactured, the ionic conductivity was 0.072 S/cm, and the methanol permeability was $8.13 \times 10^{-7}$ cm$^2$/sec (see Tables 1 and 2 below).

Figure 2:
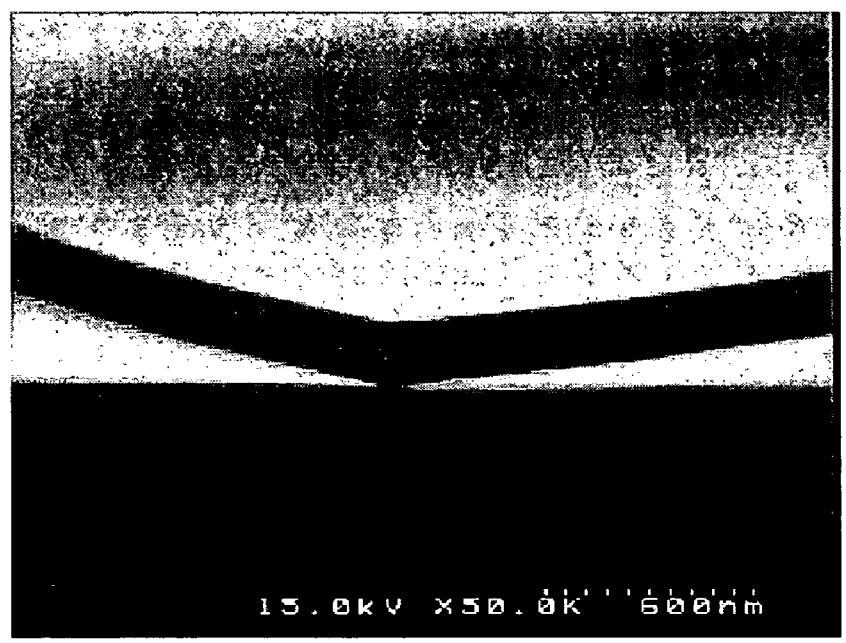
FIG. 2 shows a scanning electron microscope (SEM) image of a surface of composite polymer electrolyte membranes coated with inorganic thin films for fuel cells manufactured according to a third embodiment of the present invention.

FIG. 2 is a scanning electron microscope image of the surface of a the Nafion® 115 membrane coated with silica to a thickness of 50 nm. As can be seen in FIG. 2, silica is uniformly coated over the surface of Nafion® 115 membrane.

In Table 1, the ionic conductivities of composite polymer electrolyte membranes coated with inorganic thin films manufactured in aforementioned first to fifth embodiments and a Nafion® 115 membrane membranes are compared.

TABLE 1

|  | Resistance(Ω) | Ionic Conductivity (S/cm) |
| --- | --- | --- |
| Nafion ® 115 | 692.70 | 0.098 |
| Embodiment 1 | 704.09 | 0.091 |
| Embodiment 2 | 995.66 | 0.075 |
| Embodiment 3 | 975.56 | 0.076 |
| Embodiment 4 | 942.10 | 0.071 |
| Embodiment 5 | 943.16 | 0.072 |

In Table 2, the methanol permeabilities of composite polymer electrolyte membranes coated with inorganic thin films for fuel cells manufactured in aforementioned first to fifth embodiments and a Nafion® 115 membrane are compared.

TABLE 2

|  | Slope | Methanol Permeability (cm$^2$/sec) |
| --- | --- | --- |
| Nafion ® 115 | 0.19112 | $2.77 \times 10^{-6}$ |
| Embodiment 1 | 0.11898 | $1.68 \times 10^{-6}$ |
| Embodiment 2 | 0.05807 | $8.25 \times 10^{-7}$ |
| Embodiment 3 | 0.06399 | $9.09 \times 10^{-7}$ |
| Embodiment 4 | 0.04737 | $7.37 \times 10^{-7}$ |
| Embodiment 5 | 0.06309 | $8.13 \times 10^{-7}$ |

As can be seen in Table 1, in cases of embodiments 2 and 3 where composite polymer electrolyte membranes are coated with silica using the PECVD method, the ionic conductivity is found to reduce by about 20% compared with a Nafion membrane.

However, as can be seen in table 2, the methanol permeability in cases 2 and 3 is decreased by about 70% compared with a Nafion® 115 membrane.

In the result summarized from Table 1 and 2, it was ascertained that, if composite polymer electrolyte membranes coated with inorganic thin films for fuel cells was manufactured using a PECVD method according to the embodiments of the present invention, the methanol permeability is reduced sizably by about 70% compared with Nafion® membranes without seriously decreasing the ionic conductivity.

EMBODIMENT 6

To properly represent the characteristics of composite polymer electrolyte membranes for fuel cells, Characteristic Factor defined as the ratio of ionic conductivity and methanol permeability as shown in Eqn. 1 can be used.

$$\text{Characteristic Factor } (\Phi) = \frac{\text{Ionic Conductivity}}{\text{Methanol Permeability}} \times 10^{-3} \quad \text{[Eqn. 1]}$$

Figure 3:
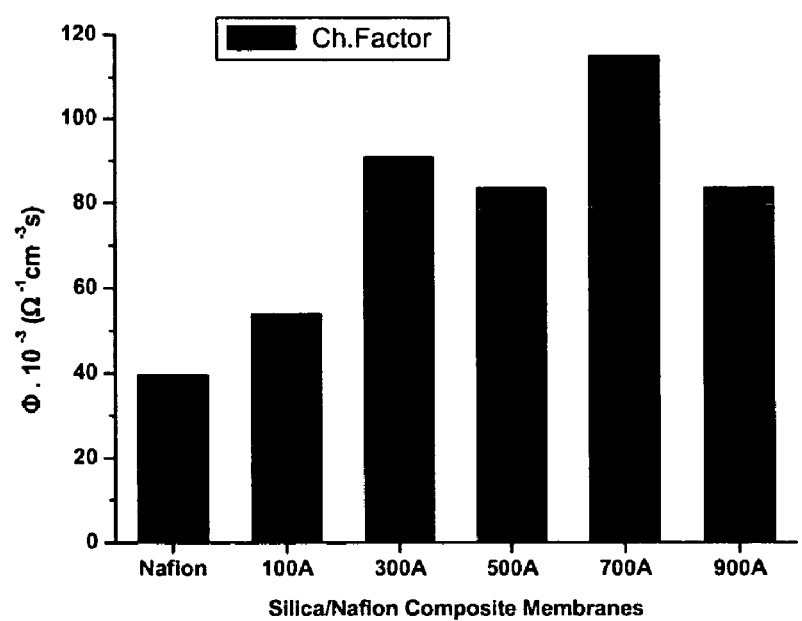
FIG. 3 shows a diagram comparing the characteristic factors of composite polymer electrolyte membranes coated with inorganic thin films for fuel cells, which are manufactured according to first to fifth embodiments of the present invention, and conventional polymer electrolyte membranes.

Characteristic factors using Eqn. 1 are obtained for embodiments 1 through 5 and an Nafion® membrane, and the results are compared in FIG. 3.

As shown in FIG. 3, the characteristic factor of composite polymer electrolyte membranes for fuel cells coated with silicon films according to the present invention is found to be superior by about 2 to 3 times to Nafion® electrolyte membranes.

In other words, it was ascertained that the characteristics of composite polymer electrolyte membranes for fuel cells coated with inorganic thin films according to the present invention is far better improved as compared with Nafion® electrolyte membranes.

EMBODIMENT 7

Composite Coating of Ionomer Solution

To enhance contact of polymer electrolyte membranes coated with silica thin films with electrodes, a 5 wt % Nafion® solution (Du Pont) is sprayed on the surface of membrane and the amount of the Nafion® material coated on the membrane is as much as 2 mg/cm$^2$ on the dry weight basis.

EXPERIMENT 1

Performance Measurement of a Fuel Cell

A DMFC has been manufactured using composite polymer electrolyte membranes for fuel cells coated with inorganic thin films according this embodiment of the present invention, and the performance of the cell has been measured. The measurement of the DMFC was performed under the condition of passive methanol feed and air breathing, in which a methanol solution of 4.5 M is used for the anode and the cathode is exposed to the air so that oxygen is naturally diffused and supplied to the electrode.

The results of performance measurement of the DMFC show that DMFCs manufactured using the polymer electrolyte membranes for fuel cells coated with silicon oxide thin films according to the present invention have a higher performance by 30 to 40% as compared with fuel cells employing unmodified Nafion® membranes.

That is because polymer electrolyte membranes coated with silicon oxide thin films according to the present invention enhances the performance of fuel cells by lowering the methanol permeability while maintaining the ionic conductivity at about the level as compared with commercial Nafion® electrolyte membranes.

The present invention, by coating the polymer electrolyte membranes for fuel cells with inorganic thin films via a PECVD method or a sputtering method, shows the effects that the performance of DMFCs is enhanced and the life of the cells is extended in such a manner that the methanol permeability is decreased sizably while the ionic conductivity is decreased just by a small amount as compared with the existing commercial polymer electrolyte membranes. Also, the PECVD method or sputtering method, being very advantageous in the improvement of electrolyte membranes in bulk, allows to manufacture low-methanol-permeable composite electrolyte membranes efficiently at a low cost.

What is claimed is:

1. A method for manufacturing composite membranes for a fuel cell, comprising a step of coating a surface of polymer electrolyte membrane with inorganic thin film using a plasma enhanced chemical vapor deposition (PECVD) method, thereby obtaining the composite membrane, wherein inorganic material of the inorganic thin film is one or more selected from the group consisting of silicon oxide ($SiO_2$), titanium oxide ($TiO_2$), zirconium oxide ($ZrO_2$), zirconium phosphate ($Zr(HPO_4)_2$), silicalite, and aluminum oxide ($Al_2O_3$);

the inorganic thin film is made by using one or more organic metal compound(s) selected from the group consisting of trimethyl disiloxanes (TMDSO), hexamethyl disilane, tetramethyl orthosilicate, tetrabutyl orthosilicate, tetra-isopropyl orthosilicate, aluminium methoxide, aluminium ethoxide, aluminium butoxide, aluminium isopropoxide, titanium ethoxide, titanium methoxide, titanium butoxide, titanium isopropoxide, zirconium ethoxide, and zirconium butoxide in conjunction with one or more gases selected from the group consisting of nitrogen, hydrogen, steam, and argon;

the inorganic thin film has a thickness of 1.0 nanometer (nm) to 500 nm;

the composite membranes have an ionic conductivity of 0.071 S/cm or more and the composite membranes have a characteristic factor of 54 $\Omega^{-1}cm^{-3}s$ or more, wherein the characteristic factor equals (ionic conductivity/methanol permeability)$\times 10^{-3}$.

2. The method of claim 1, wherein the polymer electrolyte membrane comprises perfluorosulfonic acid membrane; electrolyte membrane made of proton conducting hydrocarbon material; or electrolyte membrane made of proton conducting fluorine material.

3. The method of claim 1 wherein the PECVD method has a microwave power at the range of 10 watts to 500 watts.

4. The method of claim 1 wherein a reaction chamber pressure of the PECVD method is in the range of 1.0 to 1000 millitorr.

5. The method of claim 1 wherein an argon pre-treatment electromagnetic wave power of the PECVD method is in the range of 10 watts to 500 watts.

6. The method of claim 1 wherein a argon pre-treatment pressure of the PECVD method is in the range of 1.0 to 500 millitorr.

7. The method of claim 1 wherein a reaction gas pressure in a chamber of the PECVD method is in the range of 10 to 500 millitorr.

8. The method of claim 1 further comprising a step of coating a surface of the composite membrane with a proton-conducting ionomer solution, after coating the inorganic thin film on the surface of polymer electrolyte membrane, so as to enhance contact with electrodes during manufacturing membrane-electrode assembly.

9. A method for manufacturing an MEA comprising a step of coating catalyst for electrode directly on the composite manufactured according to claim 1.

* * * * *